United States Patent [19]

O'Connor et al.

[11] Patent Number: 4,489,177

[45] Date of Patent: Dec. 18, 1984

[54] ISOCYANATE-REACTIVE COMPOUNDS FROM TDI DISTILLATION RESIDUE AND POLYURETHANES PREPARED THEREFROM

[75] Inventors: James M. O'Connor, Clinton; Wilhelm J. Schnabel, Branford; Michael L. Rosin, Madison; Robert M. Early, North Branford, all of Conn.

[73] Assignee: Olin Corporation, Cheshire, Conn.

[21] Appl. No.: 566,835

[22] Filed: Dec. 29, 1983

[51] Int. Cl.³ .................... C08G 18/14; C08G 18/32; C08G 18/72

[52] U.S. Cl. .................................. 521/164; 521/160; 528/44; 528/67; 528/85; 560/158

[58] Field of Search ................. 521/160, 164; 528/67, 528/85, 44; 560/158

[56] References Cited

U.S. PATENT DOCUMENTS

| | | | |
|---|---|---|---|
| 3,215,652 | 11/1965 | Kaplan | 521/160 |
| 3,723,363 | 3/1973 | Shaw | 528/44 |
| 4,032,574 | 6/1977 | Keshi et al. | 260/570 D |
| 4,055,585 | 10/1977 | Okamoto et al. | 260/453 SP |
| 4,120,834 | 10/1978 | Fatutto | 521/164 |
| 4,143,008 | 3/1979 | Zwolinski et al. | 260/18 TN |
| 4,174,435 | 11/1979 | Shäfer et al. | 528/70 |
| 4,192,926 | 3/1980 | Schaefer et al. | 528/85 |
| 4,251,401 | 2/1981 | Reischl | 260/9 |
| 4,251,638 | 2/1981 | Reischl | 521/128 |
| 4,288,577 | 9/1981 | McShane | 528/85 |
| 4,293,456 | 10/1981 | Reischl | 260/9 |
| 4,297,456 | 10/1981 | Reischl et al. | 528/44 |
| 4,311,800 | 1/1982 | Reischl | 521/109 |
| 4,357,430 | 11/1982 | Van Cleve | 521/128 |

FOREIGN PATENT DOCUMENTS 590959 1/1979 U.S.S.R. ................. 528/44

*Primary Examiner*—Herbert S. Cockeram
*Attorney, Agent, or Firm*—William D. Sabo

[57] ABSTRACT

Isocyanate-reactive compounds are prepared by the reaction of TDI distillation residue with a polyol in such proportions as to obtain a reaction product having an OH-number (mg KOH/g) of about 200 to about 700. The TDI distillation residue is obtained from the distillation of the product of phosgenating toluene diamine to the corresponding toluene diisocyanate and has a toluene diisocyanate content of about 30% to about 70% by weight. The isocyanate-reactive compounds are useful in polyurethane formulations.

20 Claims, No Drawings

ISOCYANATE-REACTIVE COMPOUNDS FROM TDI DISTILLATION RESIDUE AND POLYURETHANES PREPARED THEREFROM

This invention relates to isocyanate-reactive compounds of TDI distillation residue and polyols. The invention further relates to the use of these isocyanate-reactive compounds in polyurethane formulations.

Toluene diisocyanate is produced on a large commercial scale by a process which comprises reacting toluene diamine with excess phosgene usually in the presence of an organic solvent medium. An illustrative process is disclosed in U.S. Pat. No. 3,287,387. Along with toluene diisocyanate, the phosgenation product mixture usually comprises unreacted phosgene, solvent, hydrogen chloride by-product, and a relatively substantial proportion of side reaction products in the form of residual and non-distillable materials.

Recovery of a substantial or major proportion of toluene diisocyanate from this mixture is achieved by distillation which is usually effected in two or more steps to enable removal of the low-boiling components, e.g., the phosgene and solvent, first before recovering the toluene diisocyanate. The remaining residue from distillation is a solid or viscous mixture which is often discarded.

In an effort to recycle and productively use the toluene diisocyanate distillation residue, a number of processes have been developed in the art. For example, processes have been proposed for using TDI distillation residue as a binder in the manufacture of lignocellulosic composite materials, such as particle board. Reference is made to U.S. Pat. Nos. 4,143,008 and 4,293,456. It has also been taught that TDI distillation residue can be used in the production of polyurethane compositions. According to U.S. Pat. No. 4,311,800, treated TDI distillation residues are reacted with dihydric and/or trihydric alcohols to form isocyanate-reactive compounds. However, this process involves an initial treatment step in which the distillation residue is denatured with water, thus adding to the expense of preparing usable compounds from the distillation residue.

Another approach involves preparing a dispersion from powdered TDI distillation residue and a polyhydroxyl compound. See U.S. Pat. No. 4,251,401. Like the technique disclosed in U.S. Pat. No. 4,311,800, however, pre-treatment of the TDI distillation residue is required, except that here fine grinding of the residue is carried out. Other patents which show the state of the art are U.S. Pat. Nos. 4,032,574 and 4,055,585.

For a variety of reasons, none of these techniques has proven to be entirely satisfactory.

Now an improved isocyanate-reactive compound has been developed which can be prepared by reacting TDI distillation residue with a polyol. It is a particular feature of the invention that the residue, as resulting from the distillation of the product of phosgenating toluene diamine to the corresponding toluene diisocyanate, can be used directly without initial denaturing or fine grinding treatment. The isocyanate-reactive compounds are relatively inexpensive and readily prepared, and are derived by using a material which is generally disposed of as waste. They can be used in preparing a wide variety of polyurethane products, such as foams, in particular rigid foams, and elastomers.

In forming the TDI distillation residue, any residue may be used resulting from the distillation of the product of phosgenating toluene diamine. As commonly used in the commercial production of toluene diisocyanate, the toluene diamine is typically made up of a mixture of 2,4- and 2,6-isomers and may in addition contain a minor proportion of ortho-toluene diamine. The distillation residue is usully a dark, viscous liquid which is substantially free of solvent. Along with minor amounts of phosgene, by-product hydrochloric acid, and a residual content, of at least about 30% and up to about 70% by weight of toluene diisocyanate, it usually contains a substantial amount, e.g., 30–70% by weight, of non-distillable and tarry by-products of the phosgenation reaction.

The polyol reactant that is employed according to the invention includes polyether polyols and polyester polyols and mixtures of two or more such compounds. The polyol, or mixture of polyols, preferably should have a molecular weight from about 62 to about 7,000. The average functionality of the polyol or polyol blend is usually about 2 to about 8, and preferably from about 2 to about 4.

The polyester polyols include the products of reacting polycarboxylic acids with polyhydric alcohols. Illustrative polycarboxylic acids include, for example, oxalic, malonic, succinic, glutaric, adipic, pimelic, suberic, azelaic, and the like, and mixtures thereof. Illustrative polyhydric alcohols include various diols, triols, tetrols and higher functionality alcohols, such as ethylene glycol, 1,3-propylene glycol, 1,2-propylene glycol, butylene glycols, butane diols, pentane diols, glycerol, trimethylolpropane, trimethylolhexane, pentaerythritol, sorbitol, 2-methyl glucoside, and the like, and mixtures thereof.

Suitable polyether polyols include various polyoxyalkylene polyols and mixtures thereof. These can be prepared, according to well-known methods, by condensing an alkylene oxide, or a mixture of alkylene oxides using random or step-wise addition, with a polyhydric initiator or mixture of initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth.

The polyhydric initiator used in preparing the polyether polyol reactant includes the following and mixtures thereof: (a) aliphatic diols, such as ethylene glycol, 1,3-propylene glycol, 1,2-propylene glycol, butylene glycols, butane diols, pentane diols, and the like; (b) aliphatic triols, such as glycerol, trimethylolpropane, triethylolpropane, trimethylolhexane, and the like; (c) higher functionality alcohols, such as sorbitol, pentaerythritol, methyl glucoside, and the like; (d) polyamines, such as tetraethylene diamine; and (e) alkanolamines, such as diethanolamine, triethanolamine, and the like.

A preferred group of polyhydric initiators for use in preparing the polyether polyol reactant is one which comprises aliphatic diols and triols such as ethylene glycol, propylene glycol, dipropylene glycol, glycerol, trimethylolpropane, and the like.

In preparing the polyether polyol, the oxyalkylation reaction is allowed to proceed until the desired molecular weight is reached, at which time the reaction is terminated and the resulting polyol is recovered. As noted above, the molecular weight of the resulting polyol preferably ranges from about 62 to about 7,000; more preferably, the polyether polyol has a molecular weight of about 106–3,000.

A particularly preferred group of polyols includes diethylene glycol, triethylene glycol, tetraethylene glycol, dipropylene glycol and mixtures thereof.

The reaction between the TDI distillation residue and the polyol is carried out employing such relative proportions of the reactants so as to achieve a reaction product having an OH-number (mg KOH/g) of about 200 to about 700. Preferably, the reaction product has an OH-number (mg KOH/g) of about 250 to about 600. Preferably, the reaction between the TDI distillation residue and the polyol is carried out in the presence of a suitable organic solvent. A wide range of solvents may be employed and, in fact, any inert organic solvent in which the reactants are relatively soluble can be used. Useful solvents include, for example, monochlorobenzene, o-dichlorobenzene, p-dichlorobenzene, tetrahydronaphthalene, benzene, toluene, xylene, the chlorotoluenes, the trichlorobenzenes, carbon tetrachloride, trichloroethylene, etc. Common urethane catalysts, e.g., tertiary amines and metal compounds such as stannous octoate, dibutyltin dilaurate or dibutyl (lauryl mercapto) tin, may be used to accelerate the reaction. The actual reaction conditions such as temperature and time may vary over wide ranges. Generally, a reaction temperature is employed so as to insure a completion of the reaction, and the reaction time varies considerably depending generally on the temperature and other reaction conditions. The desired product may be recovered by any conventional means, such as, for example, distillation, extraction or the like.

The resulting isocyanate-reactive compounds of the present invention may then be employed in the preparation of polyurethane products in accordance with techniques well known to those skilled in the art. Properties can be varied to form polyurethane products such as elastomers and foams.

The polyurethane products are prepared by reacting any suitable combination of an organic polyisocyanate, an isocyanate-reactive compound of the invention and optionally an additional compound reactive with the organic polyisocyanate, in the presence of a catalyst for the reaction. When the polyurethane to be produced is a foam, the reaction mixture further includes a foaming agent and usually a foam stabilizing agent. In the preparation of the polyurethane compositions, either of the general polyurethane forming processes, the "one-shot" or the "prepolymer" processes, may be utilized.

In preparing the polyurethane products of the invention, any suitable organic polyisocyanate, or mixture of polyisocyanates, may be used including toluene diisocyanate, such as the 80:20 and the 65:35 mixtures of the 2,4- and 2,6-isomeric forms, ethylene diisocyanate, propylene diisocyanate, methylene-bis(4-phenyl isocyanate), methylene-bis (4-cyclohexyl) isocyanate, xylene diisocyanate, 3,3'-bitoluene-4,4'-diisocyanate, hexamethylene diisocyanate, napthalene 1,5-diisocyanate, isophorone diisocyanate, the polymeric isocyanates such as polyphenylene polymethylene isocyanate, and the like and mixtures thereof. Preferred embodiments of the invention employ toluene diisocyanate, polyphenylene polymethylene isocyanate and mixtures thereof. In practice, the organic polyisocyanate is usually used in a proportion to provide no more than about 1.25 NCO groups per each hydroxy group, although greater amounts may also be employed. For example, the organic polyisocyanate may be used in such a proportion as to provide more than 2 NCO groups per each hydroxy group in the preparation of polyurethane-polyisocyanurate foams. A 100 multiple of the ratio of NCO to OH groups in the reaction system is referred to as the "index".

Under some circumstances, it may be preferred to include an additional compound reactive with the organic polyisocyanate in the polyurethane-forming reaction mixture. To facilitate handling, the additional compound may be added to the isocyanate-reactive compound prior to its inclusion in the polyurethane formulation. When so employed, the additional compound may be any of the polyols set forth above as being useful in the preparation of the isocyanate-reactive compound. The amount of additional compound included in the reaction mixture may vary over a wide range depending upon the properties sought in the polyurethane product. However, when used, the additional compound is generally added in a proportion ranging from about 1–75 parts per 100 parts by weight of the total compounds reactive with the organic polyisocyanate.

The catalyst employed in preparing the polyurethane compositions of the invention may be any of the catalysts known to be useful for this purpose. Depending upon the type of product desired, the catalyst may include, for example, a tertiary amine, an organo-metallic salt, a mixture of an organo-metallic salt with one or more tertiary amine, etc. Typical tertiary amines include, for example, triethylamine, triethylene diamine, trimethylamine, tetramethylene diamine, tetramethylbutane diamine, N-methylmorpholine, N-ethylmorpholine, dimethylpiperazine, trimethylaminoethylpiperazine, mixtures of bis(dimethylaminoethylether) and dipropylene glycol such as the 7:3 weight ratio mixture which is available commercially under the trademark "Niax A-1", methyldicyclohexylamine, N-cyclohexylmorpholine, dimethylcyclohexylamine, methyldiethanolamine, mixtures of dimethylcyclohexylamine and 2-(3-pentyl)-1-dimethylaminocyclohexane such as may be purchased commercially under the trademark "Polycat", bis(dimethylaminoethylpropylether), mixtures of triethylene diamine and dipropylene glycol such as the 1:2 and 1:4 weight ratio mixtures which may be purchased commercially under the trademarks "Dabco 33LV", and "Dabco 8020", respectively, bis(dimethylaminopropylether) and mixtures of these catalysts. The preferred tertiary amine catalysts are triethylene diamine, mixtures of triethylene diamine with dipropylene glycol, mixtures of bis(dimethylaminoethylether) and dipropylene glycol, dimethylcyclohexylamine alone or as a mixture thereof with 2-(3-pentyl)-1-dimethylaminocyclohexane. The tertiary amine catalyst is used in a proportion of about 0.1–3.0, and preferably about 0.25–1.5, parts per 100 parts by weight of the total compounds reactive with the organic polyisocyanate.

Typical organo-metallic salts include, for example, the salts of potassium, tin, mercury, titanium, antimony, aluminum, cobalt, zinc, bismuth, lead, and cadmium, the tin salts, i.e., stannic and stannous salts, being preferred. Illustratively, such salts include the octoates, dilaurates, diacetates, dioctoates, oleates, and neodecanoates of these metals, the octoates being preferred. The organo-metallic salt catalyst is generally used in a proportion of about 0–5.0, and preferably about 0.01–3.0, parts per 100 parts by weight of the total compounds reactive with the organic polyisocyanate.

Other catalysts suitable for use in preparing polyurethane-polyisocyanurate foams include, for example, the following and mixtures thereof: alkali and alkaline earth metal oxides, carbonates, alkoholates, phenolates, and salts of weak carbonic acids, such as sodium methoxide, sodium acetate, potassium acetate, sodium phenolate, sodium 2-ethylhexoate, and the like; quaternary hydroxides derived from nitrogen or phosphorus, such as tetraethylammonium hydroxide, benzyl-triethylammonium hydroxide, tetraethylphosphonium hydroxide, and the like; hexahydrotriazine derivatives, such as N,N',N''-tris-(3-dimethylaminopropyl)sym-hexahydrotriazine, and the like; and aminophenol derivatives, such as o-dimethylaminophenol, p-dimethylaminophenol, 2,4,6-tris(dimethylaminomethyl)phenol, and the like. Such catalysts are usually used in a proportion of about 0.01–10, and preferably about 0.1–5.0, parts per 100 parts by weight of the organic polyisocyanate.

When the product being formed is a polyurethane foam, this may be accomplished by employing a small amount of a conventional polyurethane foaming agent. Any suitable foaming agent, or mixture of foaming agents, may be employed. These include inorganic foaming agents, such as water, and organic foaming agents containing up to 7 carbon atoms, such as the halogenated hydrocarbons and the low molecular weight alkanes, alkenes and ethers. Illustrative organic foaming agents include monofluorotrichloromethane, dichlorofluoromethane, dichlorodifluoromethane, 1,1,2-trichloro-1,2,2-trifluoroethane, methylene chloride, chloroform, carbon tetrachloride, methane, ethane, ethylene, propylene, hexane, ethyl ether, diisopropyl ether, mixtures thereof and the like. Water and the low molecular weight polyhalogenated alkanes, such as monofluorotrichloromethane, dichlorodifluoromethane and methylene chloride, are preferred. The amount of foaming agent can be varied over a wide range, as is known to those skilled in the art. Generally, however, the halogenated alkanes, for example, are employed in an amount of about 2–50 parts per 100 parts by weight of the total compounds reactive with the organic polyisocyanate; and water is employed in an amount of about 1–6 parts per 100 parts by weight of the total compounds reactive with the organic polyisocyanate.

It is preferred in the preparation of the polyurethane foams of the invention to employ minor amounts of a conventional surfactant in order to further improve the cell structure of the polyurethane foam. Suitable such surfactants include, for example, the silicon-based surfactants such as the silicones and the siloxane-oxyalkylene block copolymers, all of which are commercially available materials. Generally, the silicones are employed in a proportion of up to about 0.1 parts, and the siloxane-oxyalkylene block copolymers are employed in a proportion of up to about 3 parts, both proportions being based on 100 parts by weight of the total compounds reactive with the organic polyisocyanate.

The polyurethane formulations may also include various other additives and ingredients known to those skilled in the art. For example, to provide different properties in the polyurethane foam products, fillers such as clay, calcium sulfate or ammonium phosphate may be added to lower cost and improve physical properties. Ingredients such as dyes may be added for color, and fibrous glass, asbestos or synthetic fibers may be added for strength. In addition, plasticizers, deodorants, antioxidants and flame retardants may be added.

The following examples are provided to illustrate the invention. The toluene diisocyanate distillation residue which is referred to and used throughout the examples was obtained by a conventional method, as described, for example, in U.S. Pat. No. 3,287,387, for the commercial production of toluene diisocyanate. More specifically, this method involves (a) reacting, at about 125° C., excess phosgene with a solution of toluene diamine (mixture of 2,4- and 2,6-isomers) in monochlorobenzene solvent, (b) removing the monochlorobenzene, and most of the unreacted phosgene and by-product HCl from the phosgenation product, and (c) further distilling the remaining product to recover overhead pure toluene diisocyanate. The residue from this distillation, which contains about 50% to about 70% by weight of residual toluene diisocyanate, is used in the examples.

Further in the examples, all parts and percentages are by weight unless otherwise specified.

EXAMPLE 1

106 Grams of diethylene glycol (containing 300 ppm water) were placed in a three-neck reaction flask, equipped with stirrer, reflux condenser, dropping funnel, and glass inlet tube and were heated to 60° C. 92.2 Grams of a monochlorobenzene solution, containing 50% by weight (46.1 grams) of TDI distillation residue, were added over one hour to the diethylene glycol. The distillation residue contained about 60% residual toluene diisocyanate and about 40% non-distillable polymeric by-products. The reaction mixture was then heated to about 100° C. for one hour. The solvent was removed by vacuum distillation, and the remaining reaction product was heated to 165° C., while passing a stream of nitrogen through the agitated product. The final, clear, dark colored product, containing 30% TDI distillation residue, had a viscosity of 7,000 cps at 23° C. The OH-number was found to be 595 (calculated: 615).

EXAMPLE 2

418 Grams of diethylene glycol were placed in a one liter reaction flask, equipped as described in Example 1, and heated to 60° C. 450 Grams of an orthodichlorobenzene solution, containing 50% by weight (225 grams) of TDI distillation residue, were added slowly over two hours. The rate of the addition was adjusted to maintain a temperature of 65°–70° C., and the reaction mixture was heated to 100° C. for one hour. The solvent was evaporated by vacuum distillation giving 643 grams of a clear reaction product, containing 35% by weight of TDI distillation residue, and having a viscosity of 78,000 cps at 23° C. The OH-number was found to be 542 (calculated: 545).

EXAMPLE 3

The procedure of Example 2 was repeated, except that dipropylene glycol was used instead of diethylene glycol. After removing the solvent by vacuum distillation, a final product, containing 35% TDI distillation residue, was obtained. The product had a viscosity in excess of 500,000 cps at 23° C. The OH-number was analyzed to be 389 (calculated: 398).

EXAMPLE 4

318 Grams (3.0 moles) of diethylene glycol were placed in a one liter reaction flask, equipped as described in Example 1, and heated to 50° C. 276.6 Grams of a monochlorobenzene solution, containing 50% by weight (138.3 grams) of TDI distillation residue, were added slowly within one hour to the diethylene glycol, raising the temperature to 70° C. The TDI distillation residue contained about 68% residual toluene diisocyanate and about 32% non-distillable polymeric by-products, and an NCO-group content of 37.7%. After addition of the monochlorobenzene solution, the reaction mixture was heated to about 100° C. for one hour, then the solvent was removed by vacuum distillation. The final, dark colored reaction product contained 30% TDI distillation residue and had a viscosity of 3,400 cps at 25° C. The OH-number was analyzed to be 590 (calculated: 585).

EXAMPLE 5

A rigid polyurethane foam was prepared from the following ingredients in the following proportions:

| Ingredient | Amount (Parts by Weight) |
| --- | --- |
| Polyether Polyol[1] | 25 |
| Isocyanate-Reactive Compound (Example 4) | 75 |
| Foaming Agent[2] | 38.1 |
| Surfactant[3] | 2.0 |
| Catalyst[4] | 1.5 |
| Polyphenylene Polymethylene Isocyanate[5] | 144.6 |
| (NCO/OH) | 110 index[6] |

[1] This is a polyether polyol having a molecular weight of about 420 and prepared by oxypropylating methyl glucoside to a final hydroxyl number of about 440.
[2] This is monofluorotrichloromethane and is commercially available from E. I. duPont de Nemours & Co. under the designation "Freon R-11".
[3] This is a silicone-glycol copolymer and is commercially available from Dow Corning under the designation "DC-193".
[4] This is a tertiary amine and is commercially available from Abbott Laboratories under the designation "Polycat-8".
[5] This is a commercial product of the Upjohn Company purchased under the designation "PAPI-135" and having an approximate functionality of 2.7.
[6] The proportion of isocyanate was calculated to provide in the example an index of 110.

All of the above ingredients, with the exception of the isocyanate, were added to a paper cup and stirred for 10 seconds at 1,000 rpm. The isocyanate was then added, and the mixture was stirred for 10 seconds at 2,000 rpm. The mixture was then poured into a paper box (8"×8"×4") and allowed to foam.

The physical properties of the resulting rigid polyurethane foam are tabulated in Table I below:

TABLE I

| Property | Test Method | Result |
| --- | --- | --- |
| Density, core (p.c.f.) | ASTM-D-1622-63 | 1.96 |
| Compressive Strength (p.s.i.) | | |
| Parallel To Rise | ASTM-D-1621-73, Procedure A | 27.3 |
| Perpendicular to Rise | ASTM-D-1621-73, Procedure A | 13.3 |
| "K" Factor, initial (BTU/hr./ft.$^2$/°F./in.) | ASTM-C-518-76 | 0.129 |
| Flammability, Rate of Burn (in./min.) | ASTM D-1692 | 7.74 |

What is claimed is:

1. A process for preparing an isocyanate-reactive compound, comprising reacting TDI distillation residue with a polyol in such proportions as to obtain a reaction product having an OH-number (mg KOH/g) of about 200 to about 700, said TDI distillation residue being obtained from the distillation of the product of phosgenating toluene diamine to the corresponding toluene diisocyanate and having a toluene diisocyanate content of about 30% to about 70% by weight.

2. The process of claim 1, wherein said TDI distillation residue and said polyol are employed in such proportions as to obtain a reaction product having an OH-number (mg KOH/g) of about 250 to about 600.

3. The process of claim 1, wherein said reaction between said TDI distillation residue and said polyol is carried out in the presence of an organic solvent.

4. The process of claim 1, wherein said polyol has a molecular weight from about 62 to about 7,000 and an average functionality from about 2 to about 4.

5. The process of claim 4, wherein said polyol has a molecular weight from about 106 to about 3,000.

6. The process of claim 5, wherein said polyol is selected from the group consisting of diethylene glycol, triethylene glycol, tetraethylene glycol and dipropylene glycol.

7. An isocyanate-reactive compound prepared according to the process of claim 1.

8. An isocyanate-reactive compound prepared according to the process of claim 6.

9. A process for preparing a polyurethane foam from a reaction mixture which comprises reacting an organic polyisocyanate; a foaming agent; a reaction catalyst; and an isocyanate-reactive compound prepared by reacting TDI distillation residue with a polyol in such proportions as to obtain a reaction product having an OH-number (mg KOH/g) of about 200 to about 700, said TDI distillation residue being obtained from the distillation of the product of phosgenating toluene diamine to the corresponding toluene diisocyanate and having a toluene diisocyanate content of about 30% to about 70% by weight; and, optionally, an additional compound reactive with said organic polyisocyanate.

10. The process of claim 9, wherein said TDI distillation residue and said polyol are employed in such proportions as to obtain a reaction product having an OH-number (mg KOH/g) of about 250 to about 600.

11. The process of claim 9, wherein said reaction between said TDI distillation residue and said polyol is carried out in the presence of an organic solvent.

12. The process of claim 9, wherein said polyol has a molecular weight from about 62 to about 7,000 and an average functionality from about 2 to about 4.

13. The process of claim 12, wherein said polyol has a molecular weight from about 106 to about 3,000.

14. The process of claim 13, wherein said polyol is selected from the group consisting of diethylene glycol, triethylene glycol, tetraethylene glycol and dipropylene glycol.

15. A polyurethane foam prepared according to the process of claim 9.

16. A polyurethane foam prepared according to the process of claim 14.

17. A process for preparing a polyurethane composition from a reaction mixture which comprises: reacting an organic polyisocyanate; a reaction catalyst; and an isocyanate-reactive compound prepared by reacting TDI distillation residue with a polyol in such proportions as to obtain a reaction product having an OH-number (mg KOH/g) of about 200 to about 700, said TDI distillation residue being obtained from the distillation of the product of phosgenating toluene diamine to the corresponding toluene diisocyanate and having a toluene diisocyanate of about 30% to about 70% by weight; and, optionally, an additional compound reactive with said organic polyisocyanate.

18. A process for preparing a polyurethane composition from a reaction mixture which comprises: reacting an organic polyisocyanate; a reaction catalyst; and an isocyanate-reactive compound prepared by reacting TDI distillation residue with a polyol in such proportions as to obtain a reaction product having an OH-number (mg KOH/g) of about 250 to about 600, said TDI distillation residue being obtained from the distillation of the product of phosgenating toluene diamine to the corresponding toluene diisocyanate and having a toluene diisocyanate content of about 30% to about 70% by weight, and wherein said reaction is carried out in the presence of an organic solvent; and, optionally, an additional compound reactive with said organic polyisocyanate.

19. A polyurethane composition prepared according to the process of claim 17.

20. A polyurethane composition prepared according to the process of claim 18.

* * * * *

UNITED STATES PATENT AND TRADEMARK OFFICE
CERTIFICATE OF CORRECTION

PATENT NO. : 4,489,177

DATED : December 18, 1984

INVENTOR(S) : James M. O'Connor, Wilhelm J. Schnabel, Michael L. Rosin and Robert M. Early It is certified that error appears in the above-identified patent and that said Letters Patent is hereby corrected as shown below:

Column 8, line 60, claim 17, after "diisocyanate" insert --content--.

Signed and Sealed this

Twenty-fifth Day of June 1985

[SEAL]

Attest:

DONALD J. QUIGG

Attesting Officer

Acting Commissioner of Patents and Trademarks